J. W. Gault,

Churn.

No. 69,088. Patented Sep. 24, 1867.

Witnesses.
J. M. Everitt
Jno Walker

Jacob W. Gault, Inventor.

United States Patent Office.

JACOB W. GAULT, OF PLEASANT TOWNSHIP, OHIO.

Letters Patent No. 69,088, dated September 24, 1867.

IMPROVEMENT IN CHURNS.

The Schedule referred to in these Letters Patent and making part of the same.

Be it known that I, JACOB W. GAULT, of Pleasant Township, in Hancock county, in the State of Ohio, have invented a new and useful Improvement on a Churn; and I do hereby declare that the following is a full, clear, and exact description of the construction and operation of the same, reference being had to the annexed drawings, making a part of this specification, in which—

Figure 2:
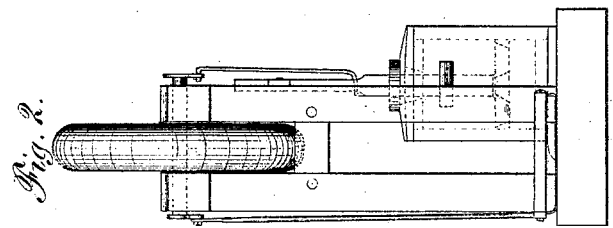
Figure 1:
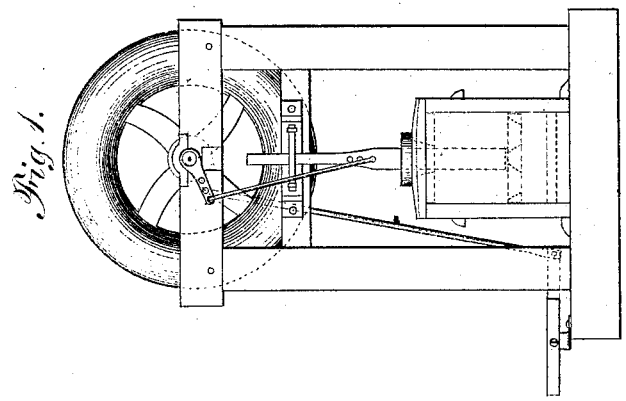

Figure 1 is a front view,

Figure 2 a side view, and

Figure 3:

Figure 3 is a view of the dasher with bevelled holes in the head.

The churn is worked by the rocking-treadle connected with a shaft moving the crank of the fly-wheel, and at the same time turning the crank on the opposite end of the axle of the fly-wheel, to which last crank is attached another shaft or pitman, which attaches to and moves the churn-dasher.

What I claim as my improvement, and desire to secure by Letters Patent, is—

The combination and arrangement of the balance-wheel, treadle, adjustable connecting-rod, churn-body, and dasher, when the several parts are constructed and operated as herein set forth.

JACOB W. GAULT.

Witnesses:
J. N. EVERETT,
JNO. WALKER.